(12) United States Patent
Khayrallah et al.

(10) Patent No.: US 9,602,242 B2
(45) Date of Patent: Mar. 21, 2017

(54) COHERENT RECEPTION WITH NOISY CHANNEL STATE INFORMATION

(71) Applicant: Telefonaktiebolaget L M Ericsson (publ), Stockholm (SE)

(72) Inventors: Ali S. Khayrallah, Mountain View, CA (US); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/300,673

(22) Filed: Jun. 10, 2014

(65) Prior Publication Data

US 2015/0358116 A1    Dec. 10, 2015

(51) Int. Cl.
| | | |
|---|---|---|
| *H03D 1/00* | (2006.01) | |
| *H04L 1/00* | (2006.01) | |
| *H04L 27/38* | (2006.01) | |
| *H04L 25/03* | (2006.01) | |

(52) U.S. Cl.
CPC ...... *H04L 1/0054* (2013.01); *H04L 25/03318* (2013.01); *H04L 27/3818* (2013.01)

(58) Field of Classification Search
CPC . H04L 1/0054; H03M 13/41; H03M 13/4107; H03M 13/6502; G11B 20/10009
USPC ......................... 375/341, 340, 316
See application file for complete search history.

(56) References Cited

U.S. PATENT DOCUMENTS

| 6,707,849 B1 | 3/2004 | Zangi et al. |
|---|---|---|
| 6,980,602 B1 | 12/2005 | Kleinerman et al. |
| 7,315,578 B2 | 1/2008 | Cheng |
| 8,116,242 B2 | 2/2012 | Thomas et al. |
| 2002/0167923 A1 | 11/2002 | Sendonaris et al. |
| 2004/0017846 A1 | 1/2004 | Fernandez-Corbaton et al. |
| 2009/0052516 A1 | 2/2009 | Chen et al. |

(Continued)

OTHER PUBLICATIONS

Cavers, James K., "An Analysis of Pilot Symbol Assisted Modulation for Rayleigh Fading Channels," IEEE Transactions on Vehicular Technology, vol. 40, No. 4, Nov. 1991, IEEE, pp. 686-693.

(Continued)

*Primary Examiner* — Zewdu Kassa
(74) *Attorney, Agent, or Firm* — Withrow & Terranova, PLLC

(57) ABSTRACT

Systems and methods for improved coherent demodulation that account for variation of an effective channel estimation error with transmitted symbols are provided. In one embodiment, a wireless node includes a receiver front-end, a channel estimator, and a soft-value processor. The receiver front-end is adapted to output samples of a received signal. The channel estimator is adapted to estimate a channel between a transmitter of the received signal and the wireless node based on the samples of the received signal. The soft-value processor is adapted to process the samples of the received signal according to a soft-value generation scheme that accounts for variation of an effective channel estimation error with transmitted symbols to thereby provide corresponding soft values. By accounting for the variation of the effective channel estimation error with transmitted symbols, the soft-value processor provides improved performance, particularly in a low Signal-to-Noise Ratio (SNR) scenario.

20 Claims, 9 Drawing Sheets

(56) References Cited

U.S. PATENT DOCUMENTS

| | | | |
|---|---|---|---|
| 2010/0248664 A1* | 9/2010 | Dent | 455/132 |
| 2010/0248666 A1 | 9/2010 | Hui et al. | |
| 2010/0266071 A1* | 10/2010 | Chen | 375/341 |
| 2011/0207400 A1 | 8/2011 | Tong | |

OTHER PUBLICATIONS

Taricco, Giorgio, "Optimum Receiver Design and Performance Analysis of Arbitrarily Correlated Rician Fading MIMO Channels With Imperfect Channel State Information," IEEE Transactions on Information Theory, vol. 56, No. 3, Mar. 2010, IEEE, pp. 1114-1134.

Benjillali, Mustapha, et al., "On Reliability Metrics for Soft-Input Decoding in Presence of Channel Estimation Errors," IEEE 63rd Vehicular Technology Conference, vol. 5, May 7-10, 2006, IEEE, pp. 2548-2552.

Wang, Michael Mao, et al., "Soft Decision Metric Generation for QAM With Channel Estimation Error," IEEE Transactions on Communications, vol. 50, Issue 7, Jul. 2002, IEEE, pp. 1058-1061.

Xiao, Weimin, "Optimal Detection of M-QAM Signal with Channel Estimation Error," IEEE International Conference on Communications, vol. 5, May 11-15, 2003, IEEE, pp. 3251-3255.

International Search Report and Written Opinion for International Patent Application No. PCT/IB2015/054244, mailed Aug. 11, 2015, 12 pages.

Duel-Hallen, Alexandra et al., "Delayed Decision-Feedback Sequence Estimation," IEEE Transactions on Communications, vol. 37, No. 5, May 1989, IEEE, pp. 428-436.

Khayrallah, A.S. et al., "Improved Channel Estimation with Side Information," IEEE 47th Vehicular Technology Conference, vol. 2, May 4-7, 1997, Phoenix, AZ, IEEE, pp. 1049-1053.

Meyr, Heinrich, et al., "Chapter 12 Detection and Parameter Synchronization on Fading Channels," in Digital Communication Receivers: Synchronization, Channel Estimation, and Signal Processing (book), 1998, John Wiley & Sons, Inc., pp. 631-677.

Sellami, Noura et al., "Generalized Map: Sequence Detection for Non-Ideal Frequency Selective Channel Knowledge," IEEE International Conference on Acoustics, Speech and Signal Processing (ICASSP), vol. 3, Apr. 15-20, 2007, Honolulu, Hawaii, IEEE, 4 pages.

Tüchler, Michael et al., "Equalization for Non-Ideal Channel Knowledge," Conference on Information Sciences and Systems, The Johns Hopkins University, Mar. 12-14, 2003, Baltimore, Maryland, 6 pages.

Ungerboeck, G., "Channel Coding With Multilevel/Phase Signals," IEEE Transactions on Information Theory, vol. 28, Issue 1, Jan. 1982, IEEE, pp. 55-67.

Non-Final Office Action for U.S. Appl. No. 14/300,658, mailed Mar. 26, 2015, 9 pages.

Final Office Action for U.S. Appl. No. 14/300,658, mailed Oct. 7, 2015, 13 pages.

Non-Final Office Action for U.S. Appl. No. 14/300,658, mailed Jan. 21, 2016, 8 pages.

Non-Final Office Action for U.S. Appl. No. 14/300,658, mailed Aug. 12, 2016, 12 pages.

International Search Report and Written Opinion for International Patent Application No. PCT/IB2015/053343, mailed Sep. 14, 2015, 11 pages.

\* cited by examiner

COHERENT RECEPTION WITH NOISY CHANNEL STATE INFORMATION

FIELD OF THE DISCLOSURE

The present disclosure relates to coherent demodulation in a wireless communications system.

BACKGROUND

The topic of reliable signal transmission at very low Signal-to-Noise Ratio (SNR) has recently become of interest in the context of machine communication in a cellular communications network. For example, an appliance in a home basement would need an extra 20 decibels (dB) of link margin to communicate with an outdoor base station. Note that this very low SNR theme was also an active topic in the context of mobile and satellite communications some years ago, resulting in a solution called high penetration paging.

The basic question that must be addressed is what modulation scheme, i.e., coherent or non-coherent, works best at very low SNR. Somewhat surprisingly, the answer is unclear, as classical communication theory essentially addresses high SNR operation. In a coherent scheme, a transmitter transmits a non-differential modulation along with pilots, and a receiver uses pilot-aided demodulation, consisting of channel estimation over the pilots to obtain knowledge of Channel State Information (CSI), followed by coherent demodulation. The CSI includes a channel estimate for a wireless communication channel between the transmitter and the receiver. In contrast, in a non-coherent scheme, a transmitter uses a differential modulation, and a receiver uses a differential demodulator. A non-coherent scheme does not require pilot transmission or knowledge of CSI.

Assuming a coherent scheme, the issue then becomes achieving reliable communication at very low SNR. Here, SNR is from the perspective of the signal, while performance is from the perspective of the bits transmitted within the signal. That is, SNR is the ratio of signal power to noise power, and performance is the bit or block error rate. From this perspective, given a modulation choice, e.g., Quadrature Phase Shift Keying (QPSK) or 16 Quadrature Amplitude Modulation (16-QAM), and a certain fixed SNR, suppose that the performance is unreliable. Then, one way to boost the performance at the fixed SNR is to accumulate more energy per bit. This is achieved with coding such as repetition, which is the simplest form of coding. More complex coding schemes can also provide some coding gain on top of the energy gain of repetition. But at low SNR, a low rate coding is needed, which effectively becomes repetition.

Repetition schemes transmit the same modulation symbol multiple times. If the channel is highly correlated across repetitions, then channel estimation can be improved. However, in the extreme case where the channel is independent across repetitions, there is no improvement in channel estimation from the repetitions. Nevertheless, overall performance will improve. The general case where the channel is correlated follows naturally in a similar way. Note that repetition is technically the same regardless of whether the repetition is in time, in frequency, or by receiving on multiple antennas. Also, correlation in time, frequency, or across multiple receive antennas, or lack of it, can be captured in the same manner. Therefore, these scenarios are interchangeably referred to herein as a Single Input Multiple Output (SIMO) scheme.

One issue with the coherent scheme is that current coherent demodulation schemes (e.g., a Maximum Likelihood (ML) receiver) assume a channel estimate at the receiver that is noiseless. However, particularly at very low SNR, this assumption is incorrect. As such, there is a need for systems and methods for improved coherent demodulation in the presence of noisy CSI and, in particular, in the presence of noisy channel estimation.

SUMMARY

Systems and methods for improved coherent demodulation that account for variation of an effective channel estimation error with transmitted symbols are provided. In one embodiment, a wireless node includes a receiver front-end, a channel estimator, and a soft-value processor. The receiver front-end is adapted to output samples of a received signal. The channel estimator is adapted to estimate a channel between a transmitter of the received signal and the wireless node based on the samples of the received signal. The soft-value processor is adapted to process the samples of the received signal according to a soft-value generation scheme that accounts for variation of an effective channel estimation error with transmitted symbols to thereby provide corresponding soft values. By accounting for the variation of the effective channel estimation error with transmitted symbols, the soft-value processor provides improved performance, particularly in a low Signal-to-Noise Ratio (SNR) scenario.

In one embodiment, the soft-value generation scheme is based on a modified Maximum Likelihood (ML) metric that accounts for the variation of the effective channel estimation error with transmitted symbols. Further, in one embodiment, the modified ML metric is defined as:

$$\mu(s) = \beta(s)^{-1} \|r - \hat{h}s\|^2 + MN_0 \ln \beta(s)$$

where $\mu(s)$ is the modified ML metric for a symbol s, r is the received signal, h is a channel estimate provided by the channel estimator, M is a number of receive antennas of the wireless node, $N_0$ is noise spectral density, and $\beta(s)$ is defined as:

$$\beta(s) = 1 + |s|^2/G,$$

where G is a processing gain resulting from channel estimation.

In one embodiment, a modulation scheme of the received signal is a Gray-Mapped N Quadrature Amplitude Modulation (N-QAM) scheme having a modulation alphabet A containing $2^k = N$ symbols. Further, in one embodiment, in order to provide the soft values, the soft-value processor is adapted to, for each sample of the received signal, generate a soft value for each bit $b_i$ in $b_0 \ldots b_{k-1}$ of a corresponding received symbol utilizing less than N values of the modified ML metric.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 5:
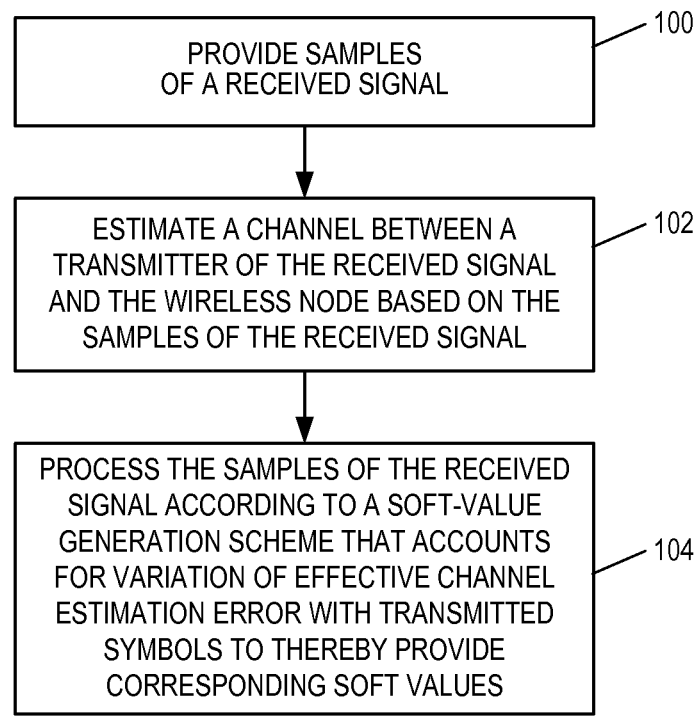
FIG. 5 is a flow chart that illustrates the operation of a wireless node according to one embodiment of the present disclosure.
Figure 9:
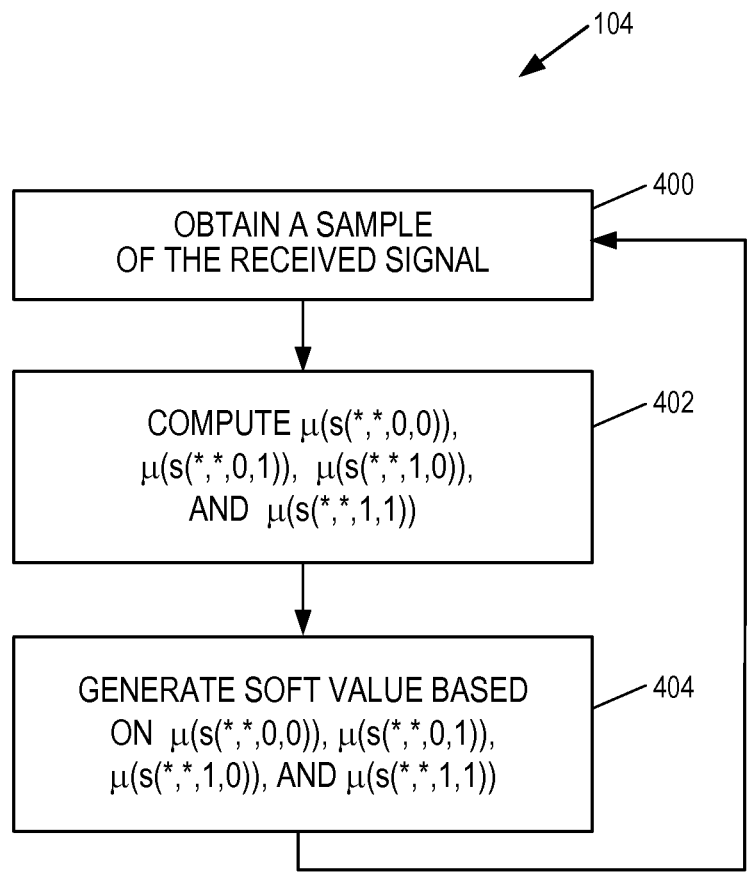
Figure 10:
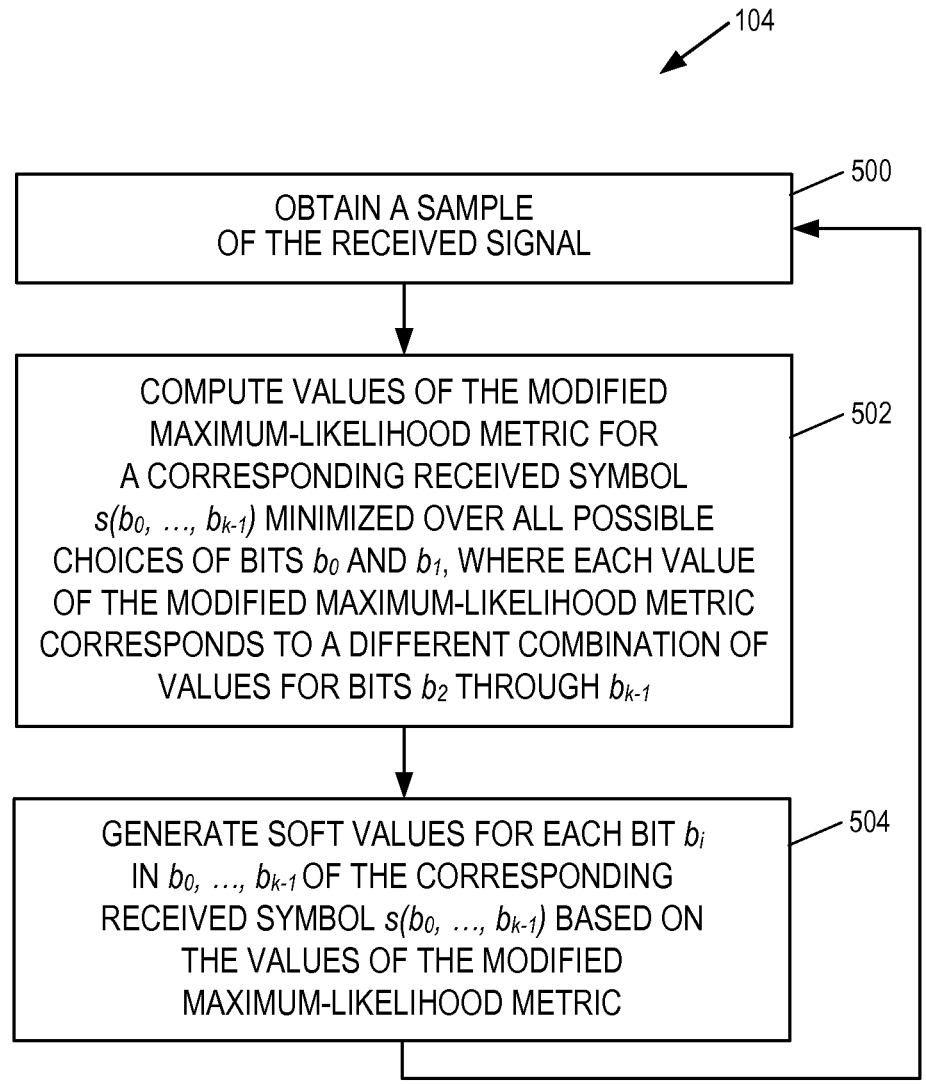

FIG. 9 is a flow chart that illustrates step 104 of FIG. 5 according to one embodiment of the present disclosure in which the fast soft-value generation process for 16-QAM is utilized; and FIG. 10 is a flow chart that illustrates step 104 of FIG. 5 according to one embodiment of the present disclosure in which a fast soft-value generation process for N Quadrature Amplitude Modulation (N-QAM) is utilized.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
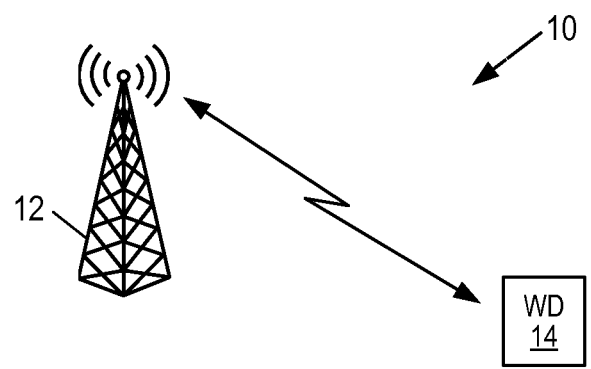
FIG. 1 illustrates one example of a cellular communications network in which a coherent demodulation scheme that accounts for an effective channel estimation error that varies with transmitted symbols according to one embodiment of the present disclosure.

Systems and methods for improved coherent demodulation in the presence of a noisy channel estimate are provided. In particular, systems and methods for improved coherent demodulation that account for an effective channel estimation error that varies with transmitted symbols are provided. In this regard, FIG. 1 illustrates one example of a cellular communications network 10 in which a coherent demodulation scheme that accounts for an effective channel estimation error that varies with transmitted symbols according to one embodiment of the present disclosure. As illustrated, the cellular communications network 10 includes a base station 12 that is included in a Radio Access Network (RAN) of the cellular communications network 10 and a wireless device 14 that wirelessly communicates with the base station 12 via an uplink and a downlink. The base station 12 may be any type of base station. For instance, in 3$^{rd}$ Generation Partnership Project (3GPP) Long Term Evolution (LTE), the base station 12 may be an evolved Node B (eNB) or a low-power base station (e.g., a pico base station, a femto base station, a home eNB, etc.). Further, while the base station 12 is illustrated, the embodiments disclosed herein are equally applicable to any type of radio access node.

The wireless device 14 is generally any type of device equipped with a transceiver capable of wireless communication with the base station 12. For example, the wireless device 14 may be a mobile device (e.g., a mobile phone), a Machine Type Communication (MTC) device, or the like. For instance, in 3GPP LTE, the wireless device 14 may be a User Equipment device (UE). Note that the term "wireless node" is used herein to generally refer to any type of device utilizing an embodiment of the coherent demodulation schemes disclosed herein. In other words, in the example of FIG. 1, the term "wireless node" refers to either a radio access node (e.g., the base station 12) or the wireless device 14.

Figure 2:
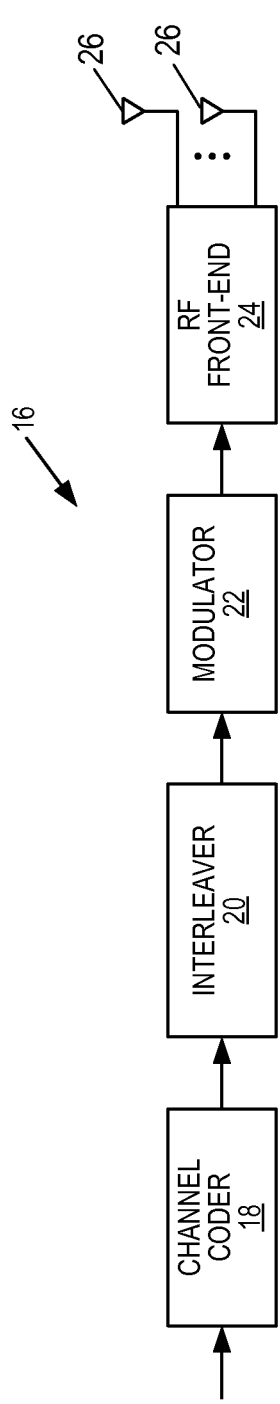
FIG. 2 illustrates one example of a transmitter of a wireless node, e.g., the base station or the wireless device of FIG. 1, according to one embodiment of the present disclosure.

FIG. 2 illustrates one example of a transmitter 16 of a wireless node, e.g., the base station 12 or the wireless device 14 of FIG. 1, according to one embodiment of the present disclosure. As illustrated, the transmitter 16 includes a channel coder 18, an interleaver 20, a modulator 22, and a Radio Frequency (RF) front-end 24 coupled to antennas 26. While multiple antennas 26 are illustrated, there may be only a single antenna 26. The channel coder 18, the interleaver 20, and the modulator 22 are implemented in hardware or any combination of hardware and software. For example, in one particular embodiment, the channel coder 18, the interleaver 20, and the modulator 22 are implemented in software stored in a computer readable medium (e.g., a non-transitory computer-readable medium such as, for example, memory) and executed by a processor (e.g., a Central Processing Unit (CPU), a Digital Signal Processor (DSP), or a similar hardware processor). However, this is only an example. Other implementations may be used. The RF front-end 24 includes a number of hardware components (e.g., Digital-to-Analog (D/A) converter(s), filter(s), mixer(s), amplifier(s), etc.).

The channel coder 18 receives information bits to be transmitted and spreads each information bit over multiple code bits. The interleaver 20 provides frequency-domain interleaving of the code bits from the channel coder 18 to thereby provide frequency domain distribution of the code bits. This is beneficial where, for example, frequency-domain diversity is desirable due to a frequency-selective channel (e.g., an Orthogonal Frequency Division Modulation (OFDM) channel where different sub-carriers experience different channel conditions). The modulator 22 then applies a desired modulation, e.g., OFDM. Note that, for OFDM, a number of modulation symbols are transmitted in parallel on different subcarriers. The modulation symbols can be from any desired modulation constellation, or alphabet, such as, for example, Quadrature Phase Shift Keying (QPSK), 16 Quadrature Amplitude Modulation (16-QAM), 64-QAM, etc. The RF front-end 24 processes the output signal of the modulator 22 to provide, e.g., D/A conversion, upconversion to a desired carrier frequency, and amplification to provide RF transmit signal(s) to be transmitted via the antenna(s) 26.

Figure 3:
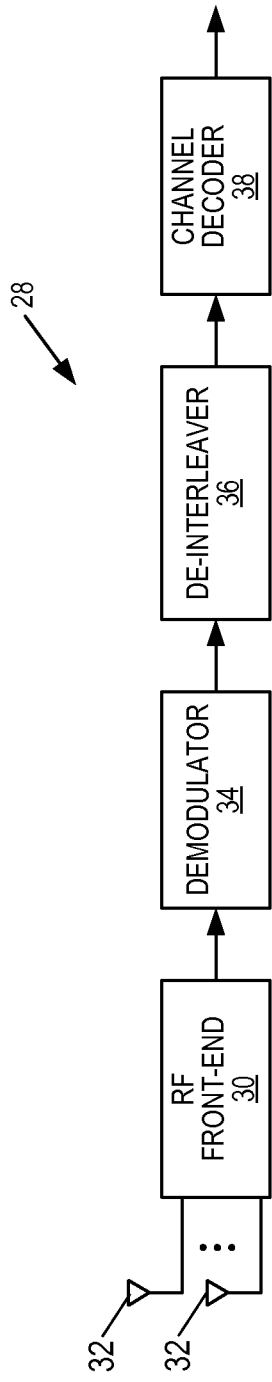
FIG. 3 illustrates a receiver of a wireless node, e.g., the base station or the wireless device of FIG. 1, according to one embodiment of the present disclosure.

FIG. 3 illustrates a receiver 28 of a wireless node, e.g., the base station 12 or the wireless device 14 of FIG. 1, according to one embodiment of the present disclosure. As illustrated, the receiver 28 includes a RF front-end 30 coupled to antennas 32, a demodulator 34, a de-interleaver 36, and a channel decoder 38. In one embodiment, the RF front-end 30 includes multiple RF receiver chains coupled to the multiple antennas 32 to enable reception according to a Single Input Multiple Output (SIMO) repetition scheme. The RF front-end 30 includes a number of hardware components (e.g., amplifier(s), filter(s), mixer(s), A/D converter(s), etc.). The demodulator 34, the de-interleaver 36, and the channel decoder 38 are implemented in hardware or any combination of hardware and software. For example, in one particular embodiment, the demodulator 34, the de-interleaver 36, and the channel decoder 38 are implemented in software stored in a computer readable medium (e.g., a non-transitory computer-readable medium such as, for example, memory) and executed by a processor (e.g., a CPU, a DSP, or a similar hardware processor). However, this is only an example. Other implementations may be used.

The RF front-end 30 receives RF signals from the antennas 32 and processes the RF signals to output samples of a received signal. The samples of the received signal are then processed by the demodulator 34, which, as discussed below, outputs corresponding soft values and, in some embodiments, bit decisions. As discussed below, the demodulator 34 processes the samples of the received signal according to a coherent demodulation scheme that takes into account an effective channel estimation error that varies with the transmitted symbols. In this manner, the demodulator 34 provides improved performance, particularly in a low Signal-to-Noise Ratio (SNR) scenario. The de-interleaver 36 provides frequency-domain interleaving of the soft values (and in some embodiments bit decisions) output by the demodulator 34. The channel decoder 38 performs channel decoding on the de-interleaved soft values (and in some embodiments bit decisions) to provide received information bits. While not illustrated, the received information bits may then be processed by, e.g., a processor of the wireless node.

Figure 4:
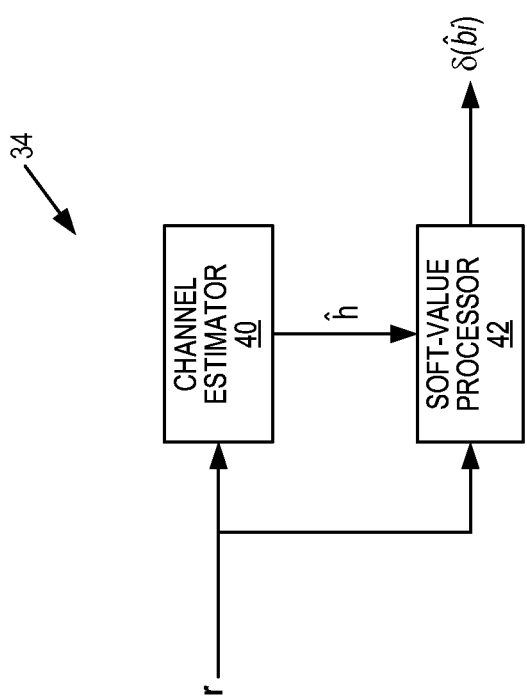
FIG. 4 is a more detailed illustration of the demodulator of FIG. 3 according to one embodiment of the present disclosure.

FIG. 4 is a more detailed illustration of the demodulator 34 of FIG. 3 according to one embodiment of the present disclosure. As illustrated, the demodulator 34 includes a channel estimator 40 and a soft-value processor 42. The received signal r is received by the demodulator 34 from the RF front-end 30. The received signal r is a vector including samples from each of the antennas 32 of the receiver 28 for a particular time instant. So, as used herein, a sample of the received signal r refers to the vector r for a particular time instant. Each sample of the received signal r corresponds to a different modulation symbol transmitted by the corresponding transmitter. These modulation symbols are also referred to herein as transmit symbols transmitted by the transmitter 16 or receive symbols received by the receiver 28. The channel estimator 40 utilizes any suitable technique to estimate a channel h between the transmitter 16 and the receiver 28 based on known pilot, or reference, symbols included in the received signal r. The estimate of the channel h is denoted as ĥ. The soft-value processor 42 processes the received signal r according to a soft-value generation scheme that takes into account an effective error in the channel estimate ĥ that varies with the transmitted symbols to thereby provide soft values $\delta(\hat{b}_i)$ for each bit $b_i$ of each received symbol. As discussed below, in one embodiment, the soft-value processor 42 provides a bit decision for each bit b and the corresponding soft value $\delta(\hat{b}_i)$ represents a confidence of the bit decision. In another embodiment, the soft-value processor 42 provides the soft value $\delta(\hat{b}_i)$ such that the soft value $\delta(\hat{b}_i)$ is a combined representation of both the bit decision for the corresponding bit $b_i$ and the confidence of the bit decision.

The soft-value generation scheme utilized by the soft-value processor 42 is based on a modified Maximum Likelihood (ML) metric that takes into account variation in the effective error of the channel estimate ĥ. In particular, for a SIMO system with M receive antennas 32, the modulation alphabet, or constellation, A has a size $2^k$. At the transmit side, the modulator 22 maps a block of k bits $b_1 \ldots b_k$ into a normalized symbol s. As used herein, normalized means that a variable has average energy 1, or the components of a vector each have average energy of 1. The received signal r at the receive side is given by:

$$r = hs + v \quad (1)$$

where v is a noise vector, modeled as White (independent components) and Gaussian (WG) with covariance $R_v = N_0 I$, where $N_0$ is noise power spectral density. The channel h (i.e., a channel vector) is modeled as WG, with covariance $R_h = E_s I$, where energy $E_s$ is attached to the channel, without loss of generality. The noise and the channel are assumed to be mutually independent.

At the receiver 28, the channel estimate is given by:

$$\hat{h} = h + e \quad (2)$$

where e is a channel estimation error modeled as independent and WG with covariance:

$$R_e = R_v/G = (N_0/G)I \quad (3)$$

Channel estimation results in a processing gain G, which is reflected in the covariance of the channel estimation error e. The channel estimation error e and the receiver noise v are assumed to be mutually independent.

In the traditional ML receiver, soft values are generated according to an ML scheme that treats the channel estimate ĥ as the noiseless channel h. Accordingly, the ML soft-value generation scheme uses the familiar Squared Euclidian Distance (SED) $\|r - \hat{h}\tilde{s}\|^2$, where $\tilde{s}$ is an instance of the transmitted symbol s. Specifically, the ML soft-value generation scheme searches over all symbol hypotheses $\tilde{s}$ in the modulation alphabet A for the symbol hypotheses $\tilde{s}$ that minimizes the SED metric. But as explained below, this baseline approach is not quite right, as it ignores the effect of channel estimation error.

Note that:

$$r - \hat{h}s = r - hs - es = v - es \overset{\text{def}}{=} w \quad (4)$$

So, the receiver 28 sees an effective error w (also referred to herein as the effective channel estimation error or the effective error of the channel estimate ĥ), with covariance $$R_w = R_v + |s|^2 R_e = N_0(1 + |s|^2/G) \quad (5)$$

where Equation (5) accounts for the mutual independence of the receiver noise v and the channel estimation error e. The covariance $R_w$ of the effective error w is modulated by the magnitude of the transmitted symbol via the function:

$$\beta(s) = 1 + |s|^2/G \quad (6)$$

which is not reflected in the SED metric. If the modulation scheme has constant magnitude symbols (e.g., Binary Phase Shift Keying (BPSK) or QPSK), then β(s) is constant and, as such, the modulation effect is not an issue (i.e., constant terms do not matter in metric comparisons). However, for a modulation scheme with variable magnitude symbols (e.g., N Quadrature Amplitude Modulation (N-QAM)), β(s) varies with the transmitted symbols and, as such, the modulation effect on the covariance $R_w$ of the effective error w becomes an issue.

As such, a new symbol metric is proposed for a modified ML soft-value generation scheme that takes into account the modulation effect on the covariance $R_w$ of the effective error w in the channel estimate ĥ produced by the variation of the magnitude of the transmitted symbols. By taking this modulation effect into account, the modified ML soft-value generation scheme boosts performance over the traditional ML soft-value generation scheme, particularly in very low SNR conditions when using modulation schemes with variable magnitude symbols.

In order to derive the modified ML symbol metric, we start from the probability of the received signal r, conditioned on the transmitted symbol s and the estimated channel h, expressed in logarithmic form for convenience:

$$\ln P(r|\hat{h},s) = \ln P(r-\hat{h}s) = \ln P(w) \quad (7)$$

This can be written as:

$$\ln P(r|\hat{h},s) = -N_0^{-1}\beta(s)^{-1}\|r-\hat{h}s\|^2 - \ln \beta(s) - M \ln N_0 - M \ln \pi \quad (8)$$

Multiplying by $N_0$, switching signs, and dropping constant terms, we obtain the new, modified ML symbol metric $\mu(s)$:

$$\mu(s) = \beta(s)^{-1}\|r-\hat{h}s\|^2 + MN_0 \ln \beta(s). \quad (9)$$

In the modified ML symbol metric $\mu(s)$, the SED is now modified by $\beta(s)$. In this manner, the modified ML symbol metric $\mu(s)$ accounts for the modulation effect on the covariance $R_w$ of the effective noise w (and particularly on the channel estimation error) produced by the variation of the magnitude of the transmitted symbols.

The modified ML symbol metric $\mu(s)$ is used by the soft-value processor 42 to generate soft values for received symbols. More specifically, in some embodiments, given the received signal r and the channel estimate $\hat{h}$, the soft-value processor 42 searches over all symbol hypotheses. $\tilde{s}$ in the modulation alphabet A for the symbol hypotheses. $\tilde{s}$ that minimizes $\mu(\tilde{s})$. The best symbol hypotheses. $\tilde{s}$ are denoted as a decided symbols or a symbol decision. The bits of the decided symbols are referred to as bit decisions or simply bits $\hat{b}_1 \ldots \hat{b}_k$.

Note that for large processing gain G, the channel estimate $\hat{h}$ converges to the true channel h, and the modified ML receiver described herein converges to the baseline, or conventional, ML receiver, as expected. This is evident from Equations (6) and (9) above. Specifically, as the processing gain G increases, $\beta(s)$ converges to 1 and, as a result, the modified ML symbol metric $\mu(s)$ converges to the SED. Also note that, in general, the advantage of the modified ML soft-value generation scheme becomes more pronounced at lower SNR, where the channel estimate $\hat{h}$ becomes noisier. Also, the advantage is more pronounced as the number M of repetitions grows.

FIG. 5 is a flow chart that illustrates the operation of a wireless node according to one embodiment of the present disclosure. As illustrated, the wireless node, and specifically the RF front-end 30 of the receiver 28 of the wireless node, first provides samples of the received signal r (step 100). The wireless node, and in particular the channel estimator 40, estimates the channel h between the transmitter 16 of the received signal and the wireless node based on the samples of the received signal r to thereby provide the channel estimate (step 102). The wireless node, and in particular the soft-value processor 42, processes the samples of the received signal r according to a soft-value generation scheme that accounts for variation of the effective channel estimation error w with transmitted symbols to thereby provide corresponding soft values (step 104).

Figure 6:
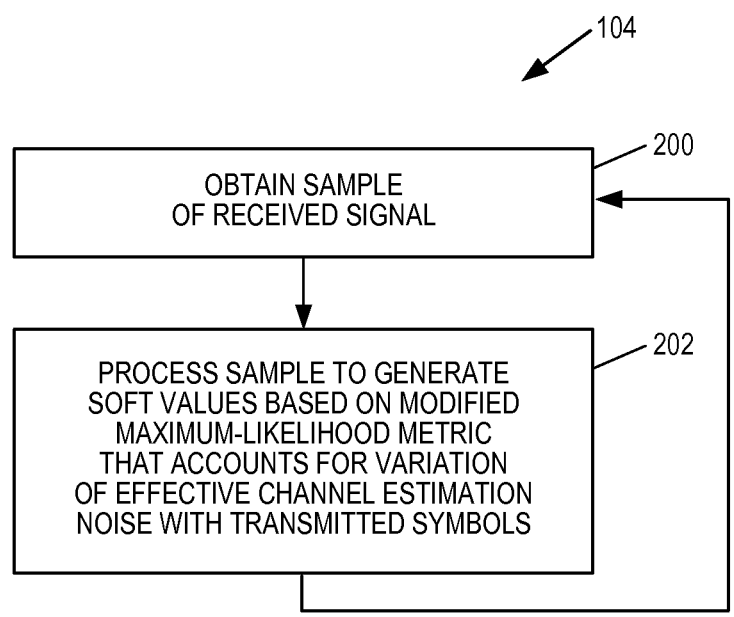
FIG. 6 is a flow chart that illustrates step 104 of FIG. 5 in more detail according to one embodiment of the present disclosure.

Step 104 is more specifically illustrated in FIG. 6 according to one embodiment of the present disclosure. As illustrated in FIG. 6, in order to process the samples of the received signal r, the wireless node, and in particular the soft-value processor 42, obtains one of the samples of the received signal r (step 200) and then processes the sample of the received signal r to generate soft values for bits $\hat{b}_1 \ldots \hat{b}_k$ of the transmitted symbol based on the modified ML symbol metric $\mu(s)$ that accounts for variation of the effective channel estimation error w with transmitted symbols (step 202). The process returns to step 200 and is repeated for the next sample of the received signal r.

Figure 7:
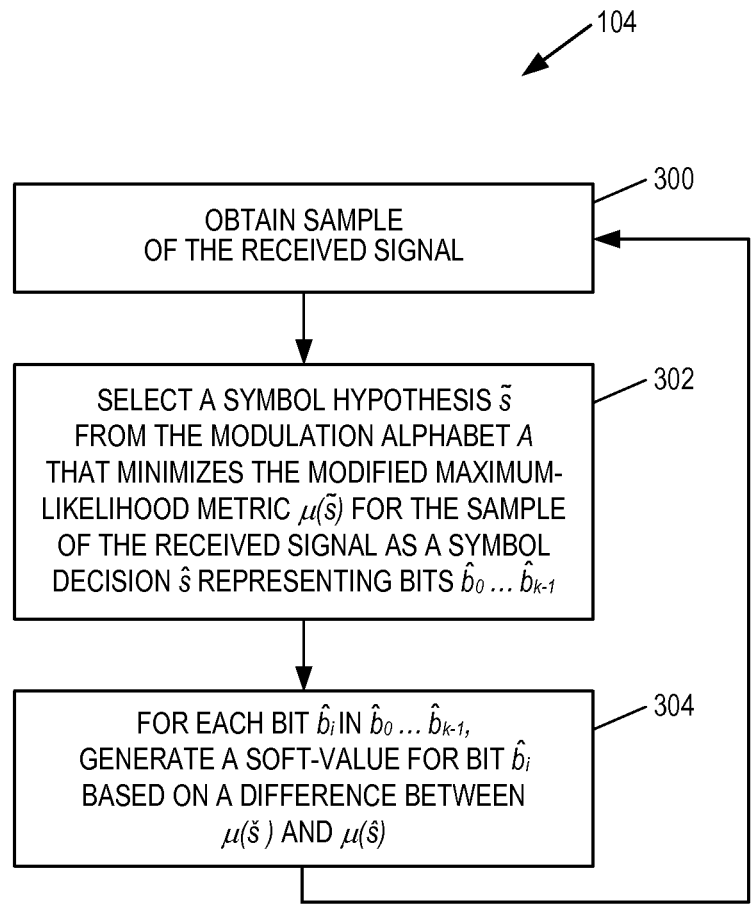
FIG. 7 is a flow chart that illustrates step 104 of FIG. 5 in more detail according to another embodiment of the present disclosure.

FIG. 7 illustrates step 104 of FIG. 5 in more detail according to another embodiment of the present disclosure. In order to process the samples of the received signal r, the wireless node, and in particular the soft-value processor 42, obtains one of the samples of the received signal r (step 300). The wireless node, and in particular the soft-value processor 42, selects a symbol hypotheses s from the modulation alphabet A that minimizes the modified ML symbol metric $\mu(\hat{s})$ for the sample of the received signal r as a symbol decisions representing bits $\hat{b}_1 \ldots \hat{b}_k$ (step 302). More specifically, for each symbol hypotheses s from the modulation alphabet A, the soft-value processor 42 computes a corresponding value of the modified ML symbol metric $\mu(\tilde{s})$. The symbol hypotheses s that corresponds to the lowest value of the modified ML symbol metric $\mu(\hat{s})$ is selected as the symbol decisions for the sample of the received signal r.

The soft-value processor 42 of the wireless node generates a soft value for each bit $\hat{b}_i$ in $\hat{b}_1 \ldots \hat{b}_k$ based on a difference between a value $\mu(\tilde{s})$ for the i-th bit of the transmitted symbol and a value of the modified ML symbol metric $\mu(\hat{s})$ for the symbol decision $\hat{s}$ (step 304). More specifically, for each bit $\hat{b}_i$ in $\hat{b}_1 \ldots \hat{b}_k$ for the symbol decision $\hat{s}$, the flipped value of the bit $\hat{b}_i$ is denoted as $\check{b}_i$. For each bit $\hat{b}_i$ in $\hat{b}_1 \ldots \hat{b}_k$ for the symbol decision $\hat{s}$, the soft-value processor 42 searches a subset $\check{A}$ of the modulation alphabet A containing all symbol hypotheses $\tilde{s}$ whose bit at index i is equal to $\check{b}_i$ for a symbol $\check{s}$ that maximizes $\mu(\tilde{s})$. In one embodiment, the soft value $\delta(\hat{b}_i)$ for each bit $\hat{b}_i$ in $\hat{b}_1 \ldots \hat{b}_k$ for the symbol decisions is then computed as:

$$\delta(\hat{b}_i) = \mu(\check{s}) - \mu(\hat{s}). \quad (10)$$

Note that since $\check{A}$ excludes $\hat{s}$, $\mu(\check{s}) \geq \mu(\hat{s})$, and $\delta(\hat{b}_i) \geq 0$. Using Equation (10), the soft value $\delta(\hat{b}_i)$ for each bit $\hat{b}_i$ is a value that represents a confidence in a separate bit decision. In other words, using Equation (10), the soft-value processor 42 outputs both a bit decision (i.e., 1 or 0) for each bit $\hat{b}_i$ and the soft value $\delta(\hat{b}_i)$ that represents a confidence of the bit decision for bit $\hat{b}_i$.

In another embodiment, the soft value $\delta(\hat{b}_i)$ for each bit $\hat{b}_i$ in $\hat{b}_1 \ldots \hat{b}_k$ for the symbol decisions represents both the bit decision and the confidence of the bit decision. More specifically, in one embodiment, the soft value $\delta(\hat{b}_i)$ for each bit $\hat{b}_i$ in $\hat{b}_1 \ldots \hat{b}_k$ for the symbol decisions is computed as:

$$\delta(\hat{b}_i) = (-1)^{\hat{b}_i}(\mu(\check{s}) - \mu(\hat{s})), \quad (11)$$

where Equation (11) uses the convention that a positive value indicates a decision $\hat{b}_i = 0$ and a negative value indicates a bit decision $\hat{b}_i = 1$. Note that Equations (10) and (11) are good approximations of a Maximum a posteriori Probability (MAP) soft value, and are much simpler.

Thus far, the description has been general in that it applies to all types of modulation schemes. However, the complexity of the soft-value generation scheme can be significantly reduced for Gray-mapped N-QAM. In particular, the modulation alphabet A of N-QAM is of size N (i.e., $2^k = N$). Thus, using the soft-value generation scheme described above, the soft-value processor 42 computes N values for the modified ML symbol metric $\mu(s)$ (i.e., the soft-value processor 42 computes $\mu(\tilde{s})$ for each symbol hypothesis s in the modulation alphabet A). Note that these values can be reused when generating the soft value $\delta(\hat{b}_i)$ for each bit $\hat{b}_i$ in the symbol decision $\hat{s}$. Thus, the total computational complexity is given by:

$$\begin{cases} N \text{ symbol metrics} \\ (N-1)\log_2 N \text{ additions/subtraction} \end{cases}$$

Figure 8:
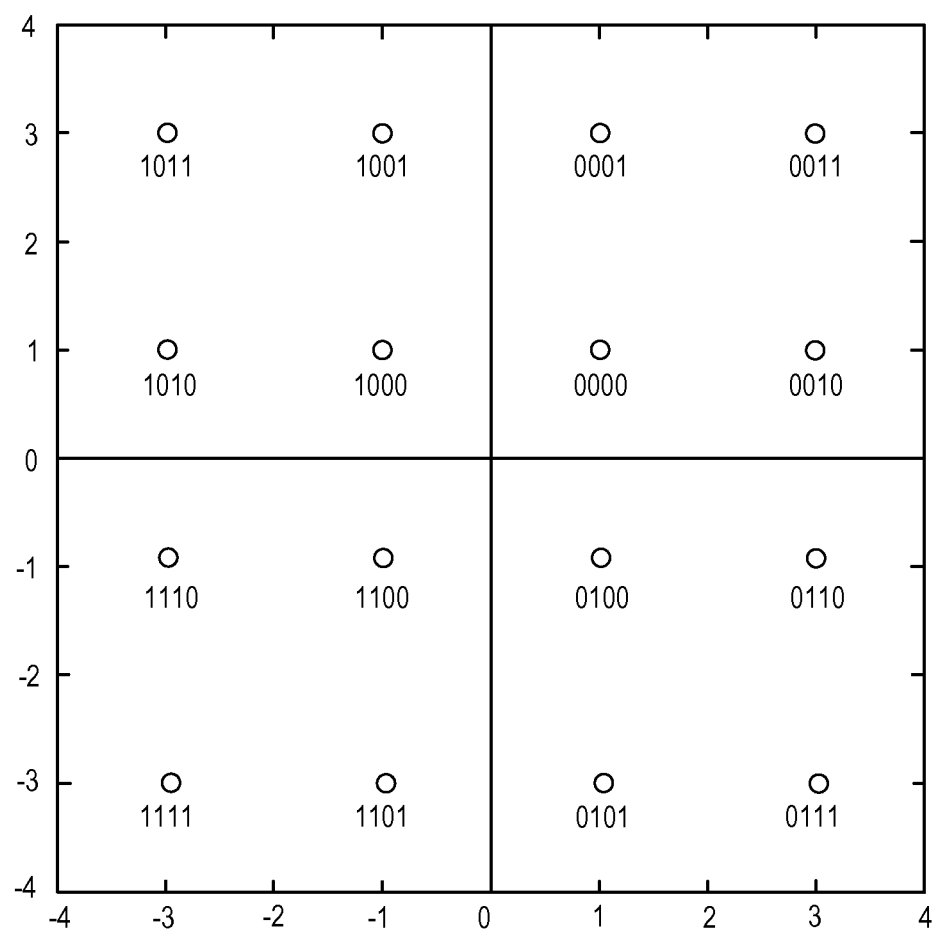
FIG. 8 illustrates the modulation alphabet A for Gray-mapped 16 Quadrature Amplitude Modulation (16-QAM)

The description below describes reduced complexity soft-value generation schemes for Gray-mapped N-QAM. As an example, FIG. 8 illustrates the modulation alphabet A for Gray-mapped 16-QAM. In the following description, the symbol s is expressed as an explicit function of the bits $(b_0, b_1, b_2, b_3)$ that map into the symbol s. For Gray-mapped 16-QAM, the symbol s is given by:

$$s(b_0, b_1, b_2, b_3) = \frac{1}{\sqrt{10}}[(1-2b_0)(1+2b_2) + j(1-2b_1)(1+2b_3)]. \quad (12)$$

The amplitude of the symbol s is then given by:

$$|s(b_0, b_1, b_2, b_3)|^2 = 1 + 4/5(b_2 + b_3 - 1). \quad (13)$$

With the specific expressions of $s(b_0, b_1, b_2, b_3)$ and $|s(b_0, b_1, b_2, b_3)|^2$, the modified ML symbol metric $\mu(s(b_0, b_1, b_2, b_3))$ can be explicitly expanded as the following, which enables closed form minimization to avoid exhaustive search as required in the straightforward soft-value computation algorithm.

$$\mu(s(b_0, b_1, 0, 0)) = \quad (14)$$
$$\frac{\|r\|^2 + \frac{1}{5}\|\hat{h}\|^2 - [(1-2b_0)\text{Re}\{x\} + (1-2b_1)\text{Im}\{x\}]}{1 + \frac{1}{5G}} + MN_0 \ln\left(1 + \frac{1}{5G}\right)$$

$$\mu(s(b_0, b_1, 0, 1)) = \quad (15)$$
$$\frac{\|r\|^2 + \|\hat{h}\|^2 - [(1-2b_0)\text{Re}\{x\} + 3(1-2b_1)\text{Im}\{x\}]}{1 + \frac{1}{G}} + MN_0 \ln\left(1 + \frac{1}{G}\right)$$

$$\mu(s(b_0, b_1, 1, 0)) = \quad (16)$$
$$\frac{\|r\|^2 + \|\hat{h}\|^2 - [3(1-2b_0)\text{Re}\{x\} + (1-2b_1)\text{Im}\{x\}]}{1 + \frac{1}{G}} + MN_0 \ln\left(1 + \frac{1}{G}\right)$$

$$\mu(s(b_0, b_1, 1, 1)) = \quad (17)$$
$$\frac{\|r\|^2 + \frac{9}{5}\|\hat{h}\|^2 - [3(1-2b_0)\text{Re}\{x\} + 3(1-2b_1)\text{Im}\{x\}]}{1 + \frac{9}{5G}} + MN_0 \ln\left(1 + \frac{9}{5G}\right)$$

where x is the accumulated received signal:

$$x \triangleq \sqrt{2/5}\hat{h}^H r \quad (18)$$

and $\text{Re}\{x\}$ and $\text{Im}\{x\}$ are the real and imaginary parts of x.

In the following, the symbol metric function is denoted as minimized over all possible choices of $b_0$, $b_1$ as $\mu(s(*,*,b_2,b_3))$:

$$\mu(s(*,*,0,0)) \triangleq \min_{b_0, b_1 \in \{0,1\}} \mu(s(b_0, b_1, b_2, b_3)). \quad (19)$$

For example, if $\text{Re}\{x\} > 0$, then $b_0 = 0$ should be chosen to minimize $\mu(s(b_0, b_1, 0, 0))$. If $\text{Re}\{x\} < 0$, then $b_0 = 1$ should be chosen to minimize the symbol metric function $\mu(s(b_0, b_1, 0, 0))$. Similarly, the value of $b_1$ can be chosen according to whether $\text{Im}\{x\}$ is positive or negative to minimize the symbol metric function $\mu(s(b_0, b_1, 0, 0))$.

The minimized symbol function over all possible choices of $b_0$, $b_1$ can be found to be:

$$\mu(s(*,*,0,0)) = \quad (20)$$
$$\frac{\|r\|^2 + \frac{1}{5}\|\hat{h}\|^2 - [|\text{Re}\{x\}| + |\text{Im}\{x\}|]}{1 + \frac{1}{5G}} + MN_0 \ln\left(1 + \frac{1}{5G}\right)$$

$$\mu(s(*,*,0,1)) = \quad (21)$$
$$\frac{\|r\|^2 + \|\hat{h}\|^2 - [|\text{Re}\{x\}| + 3|\text{Im}\{x\}|]}{1 + \frac{1}{G}} + MN_0 \ln\left(1 + \frac{1}{G}\right)$$

$$\mu(s(*,*,1,0)) = \quad (22)$$
$$\frac{\|r\|^2 + \|\hat{h}\|^2 - [3|\text{Re}\{x\}| + |\text{Im}\{x\}|]}{1 + \frac{1}{G}} + MN_0 \ln\left(1 + \frac{1}{G}\right)$$

$$\mu(s(*,*,1,1)) = \quad (23)$$
$$\frac{\|r\|^2 + \frac{9}{5}\|\hat{h}\|^2 - [3|\text{Re}\{x\}| + 3|\text{Im}\{x\}|]}{1 + \frac{9}{5G}} + MN_0 \ln\left(1 + \frac{9}{5G}\right)$$

The minimized symbol function over all possible choices of $b_0, b_1, b_2$ can be computed as:

$$\mu(s(*,*,*,0)) \triangleq \min_{b_0, b_1, b_2 \in \{0,1\}} \mu(s(b_0, b_1, b_2, 0)) \quad (24)$$
$$= \min(\mu(s(*,*,0,0)), \mu(s(*,*,1,0)))$$

$$\mu(s(*,*,*,1)) \triangleq \min_{b_0, b_1, b_2 \in \{0,1\}} \mu(s(b_0, b_1, b_2, 1)) \quad (25)$$
$$= \min(\mu(s(*,*,0,1)), \mu(s(*,*,1,1)))$$

The minimized symbol function over all possible choices of $b_0, b_1, b_3$ can be computed as:

$$\mu(s(*,*,0,*)) \triangleq \min_{b_0, b_1, b_3 \in \{0,1\}} \mu(s(b_0, b_1, 0, b_3)) \quad (26)$$
$$= \min(\mu(s(*,*,0,0)), \mu(s(*,*,0,1)))$$

$$\mu(s(*,*,1,*)) \triangleq \min_{b_0,b_1,b_3 \in \{0,1\}} \mu(s(b_0,b_1,1,b_3)) \qquad (27)$$
$$= \min(\mu(s(*,*,1,0)), \mu(s(*,*,1,1)))$$

The minimized symbol function over all possible choices of $b_0, b_1, b_2, b_3$ can be computed as:

$$\mu(s(*,*,*,*)) \triangleq \min_{b_0,b_1,b_2,b_3 \in \{0,1\}} \mu(s(b_0,b_1,b_2,b_3)) \qquad (28)$$
$$= \min(\mu(s(*,*,0,*)), \mu(s(*,*,1,*)))$$

The bit soft values of $b_2$ and $b_3$ can then be computed as $$\delta(b_2) = \mu(s(*,*,0,*)) - \mu(s(*,*,1,*)) \qquad (29)$$

$$\delta(b_3) = \mu(s(*,*,*,0)) \mu(s(*,*,*,1)) \qquad (30)$$

We note that the symbol metric function minimized over $b_1$ only is given by $$\mu(s(b_0,*,0,0)) \triangleq \min_{b_1 \in \{0,1\}} \mu(s(b_0,b_1,0,0)) \qquad (31)$$
$$= \mu(s(*,*,0,0)) + \frac{|\operatorname{Re}\{x\}| - (1-2b_0)\operatorname{Re}\{x\}}{1+\frac{1}{5G}}$$

$$\mu(s(b_0,*,0,1)) \triangleq \min_{b_1 \in \{0,1\}} \mu(s(b_0,b_1,0,1)) \qquad (32)$$
$$= \mu(s(*,*,0,1)) + \frac{|\operatorname{Re}\{x\}| - (1-2b_0)\operatorname{Re}\{x\}}{1+\frac{1}{G}}$$

$$\mu(s(b_0,*,1,0)) \triangleq \min_{b_1 \in \{0,1\}} \mu(s(b_0,b_1,1,0)) \qquad (33)$$
$$= \mu(s(*,*,1,0)) + \frac{3[|\operatorname{Re}\{x\}| - (1-2b_0)\operatorname{Re}\{x\}]}{1+\frac{1}{G}}$$

$$\mu(s(b_0,*,1,1)) \triangleq \min_{b_1 \in \{0,1\}} \mu(s(b_0,b_1,1,1)) \qquad (34)$$
$$= \mu(s(*,*,1,1)) + \frac{3[|\operatorname{Re}\{x\}| - (1-2b_0)\operatorname{Re}\{x\}]}{1+\frac{9}{5G}}$$

It can then be concluded that, if $\operatorname{Re}\{x\} > 0$, $$\delta(b_0) = \min\begin{pmatrix}\mu(s(*,*,0,0))\\ \mu(s(*,*,0,1))\\ \mu(s(*,*,1,0))\\ \mu(s(*,*,1,1))\end{pmatrix} - \min\begin{pmatrix}\mu(s(*,*,0,0)) + \frac{2|\operatorname{Re}\{x\}|}{1+\frac{1}{5G}}\\ \mu(s(*,*,0,1)) + \frac{2|\operatorname{Re}\{x\}|}{1+\frac{1}{G}}\\ \mu(s(*,*,1,0)) + \frac{6|\operatorname{Re}\{x\}|}{1+\frac{1}{G}}\\ \mu(s(*,*,1,1)) + \frac{6|\operatorname{Re}\{x\}|}{1+\frac{9}{5G}}\end{pmatrix} \qquad (35)$$

and if $\operatorname{Re}\{x\} < 0$, $$\delta(b_0) = \min\begin{pmatrix}\mu(s(*,*,0,0)) + \frac{2|\operatorname{Re}\{x\}|}{1+\frac{1}{5G}}\\ \mu(s(*,*,0,1)) + \frac{2|\operatorname{Re}\{x\}|}{1+\frac{1}{G}}\\ \mu(s(*,*,1,0)) + \frac{6|\operatorname{Re}\{x\}|}{1+\frac{1}{G}}\\ \mu(s(*,*,1,1)) + \frac{6|\operatorname{Re}\{x\}|}{1+\frac{9}{5G}}\end{pmatrix} - \min\begin{pmatrix}\mu(s(*,*,0,0))\\ \mu(s(*,*,0,1))\\ \mu(s(*,*,1,0))\\ \mu(s(*,*,1,1))\end{pmatrix} \qquad (36)$$

To proceed, we define the sign function:

$$\operatorname{sgn}(x) = \begin{cases}+1, & \text{if } x \geq 0\\ -1, & \text{if } x < 0\end{cases} \qquad (37)$$

The bit soft values of $b_0$, and $b_1$ can then be computed as:

$$\delta(b_0) = \qquad (38)$$
$$\operatorname{sgn}\left(\operatorname{Re}\{\hat{h}^H r\}\right)\left[\mu(s(*,*,*,*)) - \min\begin{pmatrix}\mu(s(*,*,0,0)) + \frac{2|\operatorname{Re}\{x\}|}{1+\frac{1}{5G}}\\ \mu(s(*,*,0,1)) + \frac{2|\operatorname{Re}\{x\}|}{1+\frac{1}{G}}\\ \mu(s(*,*,1,0)) + \frac{6|\operatorname{Re}\{x\}|}{1+\frac{1}{G}}\\ \mu(s(*,*,1,1)) + \frac{6|\operatorname{Re}\{x\}|}{1+\frac{9}{5G}}\end{pmatrix}\right]$$

and $$\delta(b_1) = \operatorname{sgn}\left(\operatorname{Im}\{\hat{h}^H r\}\right)\left[\mu(s(*,*,*,*)) - \min\begin{pmatrix}\mu(s(*,*,0,0)) + \frac{2|\operatorname{Im}\{x\}|}{1+\frac{1}{5G}}\\ \mu(s(*,*,0,1)) + \frac{6|\operatorname{Im}\{x\}|}{1+\frac{1}{G}}\\ \mu(s(*,*,1,0)) + \frac{2|\operatorname{Im}\{x\}|}{1+\frac{1}{G}}\\ \mu(s(*,*,1,1)) + \frac{6|\operatorname{Im}\{x\}|}{1+\frac{9}{5G}}\end{pmatrix}\right] \qquad (39)$$

The total computation complexity of the soft-value generation scheme when searching across all symbol hypotheses $\tilde{s}$ for the Gray-mapped 16-QAM is $$\begin{cases}\text{symbol metrics}\\ 60 \text{ additions/subtraction}\end{cases}$$

In contrast, the total computation complexity of the fast soft-value generation process described above with respect to Equations (29), (30), (38), and (39) for the Gray-mapped 16-QAM is { 4 symbol metrics { 23 additions/subtraction Note that symbol metric calculation involves complex number multiplication and additions. Each symbol metric calculation is hence more complicated than a real number addition/subtraction.

FIG. 9 is a flow chart that illustrates step 104 of FIG. 5 according to one embodiment in which the fast soft-value generation process for 16-QAM is utilized. As illustrated, in order to process the samples of the received signal r, the wireless node, and in particular the soft-value processor 42, obtains one of the samples of the received signal r (step 400). The wireless node, and in particular the soft-value processor 42, then computes the modified ML symbol metric values $\mu(s(*,*,0,0))$, $\mu(s(*,*,0,1))$, $\mu(s(*,*,1,0))$, and $\mu(s(*,*,1,1))$ according to Equations (20)-(23) above (step 402). The wireless node, and in particular the soft-value processor 42, then generates soft values for bits $b_0, b_1, b_2$, and $b_3$ based on the modified ML symbol metric values $\mu(s(*,*,0,0))$, $\mu(s(*,*,0,1))$, $\mu(s(*,*,1,0))$, and $\mu(s(*,*,1,1))$ according to Equations (38), (39), (29) and (30), respectively (step 404). The process then returns to step 400 and is repeated. In this manner, soft values are computed using a low-complexity and fast soft-value generation scheme that takes into account the modulation effect on the effective channel error was a result of variation in the amplitude of the transmitted symbols.

While the example above focuses on Gray-mapped 16-QAM, the fast soft-value generation process described above can be utilized for N-QAM in general (e.g., 8-QAM, 16-QAM, 32-QAM, 64-QAM, 128-QAM, 256-QAM, etc.). In this regard, FIG. 10 is a flow chart that illustrates step 104 of FIG. 5 according to one embodiment in which a fast soft-value generation process for N-QAM is utilized. As illustrated, in order to process the samples of the received signal r, the wireless node, and in particular the soft-value processor 42, obtains one of the samples of the received signal r (step 500). The wireless node, and in particular the soft-value processor 42, then computes the modified ML symbol metric values for a corresponding received symbol $s(b_0, \ldots, \hat{b}_{k-1})$ minimized over all possible choices of bits $b_0$, and $b_1$, where each value of modified ML symbol metric corresponds to a different combination of values for bits $b_2$ through $b_{k-1}$ (step 502). These values of the modified ML symbol metric are denoted herein as $\mu(s(*,*,b_2, \ldots, b_{k-1}))$ for all combinations of $b_2$ through $b_{k-1}$ (i.e., $\mu(s(*,*0, \ldots, 0))$, $\mu(s(*,*,0, \ldots, 1))$, \ldots, $\mu(s(*,*,1, \ldots, 0))$, \ldots, $\mu(s(*,*,1, \ldots, 1))$), and can be computed in a manner similar to that by which the $\mu(s(*,*,0,0))$, $\mu(s(*,*,0,1))$, $\mu(s(*,*,1,0))$, and $\mu(s(*,*,1,1))$ are computed above. The wireless node, and in particular the soft-value processor 42, then generates soft values for bits $b_0, \ldots, b_{k-1}$ based on the modified ML symbol metric values $\mu(s(*,*,b_2, \ldots, b_{k-1}))$ for all combinations of $b_2$ through $b_{k-1}$ (step 504). The process then returns to step 400 and is repeated.

The following acronyms are used throughout this disclosure.

16-QAM 16 Quadrature Amplitude Modulation
3GPP 3$^{rd}$ Generation Partnership Project
BPSK Binary Phase Shift Keying
CPU Central Processing Unit
CSI Channel State Information
D/A Digital-to-Analog
dB Decibel
DSP Digital Signal Processor
eNB Evolved Node B
LTE Long Term Evolution
MAP Maximum a posteriori Probability
ML Maximum Likelihood
MTC Machine Type Communication
N-QAM N Quadrature Amplitude Modulation
OFDM Orthogonal Frequency Division Modulation
QPSK Quadrature Phase Shift Keying
RAN Radio Access Network
RF Radio Frequency
SED Squared Euclidian Distance
SIMO Single Input Multiple Output
SNR Signal-to-Noise Ratio
UE User Equipment
WG White and Gaussian Those skilled in the art will recognize improvements and modifications to the embodiments of the present disclosure. All such improvements and modifications are considered within the scope of the concepts disclosed herein and the claims that follow.

What is claimed is:

1. A wireless node comprising:
    a Radio Frequency, RF, front-end adapted to output samples of a received signal;
    a channel estimator adapted to estimate a channel between a transmitter of the received signal and the wireless node based on the samples of the received signal; and
    a soft-value processor adapted to process the samples of the received signal according to a soft-value generation scheme that accounts for variation of effective channel estimation error with transmitted symbols to thereby provide corresponding soft values,
    wherein the soft-value generation scheme is based on a modified maximum likelihood metric that accounts for the variation of the effective channel estimation error with transmitted symbols and wherein the modified maximum likelihood metric is defined as:

$$\mu(s)=\beta(s)^{-1}\|r-\hat{h}s\|^2+MN_0 \ln \beta(s)$$

where $\mu(s)$ is the modified maximum likelihood metric for a symbol s, r is the received signal, $\hat{h}$ is a channel estimate provided by the channel estimator, M is a number of receive antennas of the wireless node, $N_0$ is noise power spectral density, and $\beta(s)$ is defined as:

$$\beta(s)=1+|s|^2/G,$$

where G is a processing gain resulting from channel estimation.

2. The wireless node of claim 1 wherein a modulation scheme of the received signal has a modulation alphabet A containing $2^k$ symbols, and, in order to provide the soft values, the soft-value processor is adapted to, for each sample of the received signal:
    select a symbol hypothesis s from the modulation alphabet A that minimizes the modified maximum likelihood metric $\mu(\tilde{s})$ for the sample of the received signal as a symbol decision $\hat{s}$ representing bits $\hat{b}_0 \ldots \hat{b}_{k-1}$; and
    for each bit $\hat{b}_i$ in $\hat{b}_0 \ldots \hat{b}_{k-1}$, generate a soft value for bit $\hat{b}_i$ based on a difference between $\mu(\check{s})$ and $\mu(\hat{s})$, where $\check{s}$ is a symbol from a subset $\check{A}$ of the modulation alphabet A containing all symbol hypotheses $\tilde{s}$ having a bit value $\check{b}_i$ that is the opposite of the bit $\hat{b}_i$ that minimizes $\mu(\tilde{s})$ for the subset $\check{A}$.

3. The wireless node of claim 2 wherein the soft-value processor is further adapted to generate the soft value for the bit $\hat{b}_i$ according to:

$$\delta(\hat{b}_i) = \mu(\check{s}) - \mu(\hat{s}),$$

where $\delta(\hat{b}_i)$ is the soft value for the bit $\hat{b}_i$.

4. The wireless node of claim 2 wherein the soft-value processor is further adapted to generate the soft value for the bit $\hat{b}_i$ according to:

$$\delta(\hat{b}_i) = (-1)^{\hat{b}_i}(\mu(\check{s}) - \mu(\hat{s})),$$

where $\delta(\hat{b}_i)$ is the soft value for the bit $\hat{b}_i$ and the soft value $\delta(\hat{b}_i)$ represents both a bit decision for the bit $\hat{b}_i$ and a confidence of the bit decision for the bit $\hat{b}_i$.

5. The wireless node of claim 1 wherein a modulation scheme of the received signal is a Gray-Mapped N Quadrature Amplitude Modulation, N-QAM, scheme having a modulation alphabet A containing $2^k = N$ symbols.

6. The wireless node of claim 5 wherein in order to provide the soft values, the soft-value processor is adapted to, for each sample of the received signal, generate a soft value for each bit $\hat{b}_i$ in $b_0 \ldots b_{k-1}$ of a corresponding received symbol utilizing less than N values of the modified maximum likelihood metric.

7. The wireless node of claim 5 wherein in order to provide the soft values, the soft-value processor is adapted to, for each sample of the received signal:

compute values of the modified maximum likelihood metric defined as:

$$\mu(s(*,*,0,0)) = \frac{\|r\|^2 + \frac{1}{5}\|\hat{h}\|^2 - [|\text{Re}\{x\}| + |\text{Im}\{x\}|]}{1 + \frac{1}{5G}} + MN_0 \ln\left(1 + \frac{1}{5G}\right)$$

$$\mu(s(*,*,0,1)) = \frac{\|r\|^2 + \|\hat{h}\|^2 - [|\text{Re}\{x\}| + 3|\text{Im}\{x\}|]}{1 + \frac{1}{G}} + MN_0 \ln\left(1 + \frac{1}{G}\right)$$

$$\mu(s(*,*,1,0)) = \frac{\|r\|^2 + \|\hat{h}\|^2 - [3|\text{Re}\{x\}| + |\text{Im}\{x\}|]}{1 + \frac{1}{G}} + MN_0 \ln\left(1 + \frac{1}{G}\right)$$

$$\mu(s(*,*,1,1)) = \frac{\|r\|^2 + \frac{9}{5}\|\hat{h}\|^2 - [3|\text{Re}\{x\}| + 3|\text{Im}\{x\}|]}{1 + \frac{9}{5G}} + MN_0 \ln\left(1 + \frac{9}{5G}\right)$$

wherein a received symbol $s(b_0, b_1, b_2, b_3)$ is a function of bits $b_0 \ldots b_3$, $\mu(s(*,*,b_2,b_3))$ is the modified maximum likelihood metric for the received symbol $s(b_0, b_1, b_2, b_3)$ minimized over all possible choices of the bits $b_0$ and $b_1$ for given values for the bits $b_2$ and $b_3$, and x is defined as:

$$x \triangleq \sqrt{2/5}\hat{h}^H r; \text{ and}$$

generate soft values for each bit $b_i$ in $b_0 \ldots b_3$ of a corresponding received symbol based on values $\mu(s(*,*,0,0))$, $\mu(s(*,*,0,1))$, $\mu(s(*,*,1,0))$, and $\mu(s(*,*,1,1))$.

8. The wireless node of claim 7 wherein in order to generate the soft values for each bit $b_i$ in $b_0 \ldots b_3$ of the corresponding received symbol, the soft-value processor is further adapted to:

generate the soft value $\delta(b_0)$ for the bit $b_0$ in $b_0 \ldots b_3$ of the corresponding received symbol according to:

$$\delta(b_0) = \text{sgn}\left(\text{Re}\{\hat{h}^H r\}\right)\left[\mu(s(*,*,*,*)) - \min\begin{pmatrix}\mu(s(*,*,0,0)) + \frac{2|\text{Re}\{x\}|}{1 + \frac{1}{5G}} \\ \mu(s(*,*,0,1)) + \frac{2|\text{Re}\{x\}|}{1 + \frac{1}{G}} \\ \mu(s(*,*,1,0)) + \frac{6|\text{Re}\{x\}|}{1 + \frac{1}{G}} \\ \mu(s(*,*,1,1)) + \frac{6|\text{Re}\{x\}|}{1 + \frac{9}{5G}}\end{pmatrix}\right];$$

generate the soft value $\delta(b_1)$ for the bit $b_1$ in $b_0 \ldots b_3$ of the corresponding received symbol according to:

$$\delta(b_1) = \text{sgn}\left(\text{Im}\{\hat{h}^H r\}\right)\left[\mu(s(*,*,*,*)) - \min\begin{pmatrix}\mu(s(*,*,0,0)) + \frac{2|\text{Im}\{x\}|}{1 + \frac{1}{5G}} \\ \mu(s(*,*,0,1)) + \frac{6|\text{Im}\{x\}|}{1 + \frac{1}{G}} \\ \mu(s(*,*,1,0)) + \frac{2|\text{Im}\{x\}|}{1 + \frac{1}{G}} \\ \mu(s(*,*,1,1)) + \frac{6|\text{Im}\{x\}|}{1 + \frac{9}{5G}}\end{pmatrix}\right];$$

generate the soft value $\delta(b_2)$ for the bit $b_2$ in $b_0 \ldots b_3$ of the corresponding received symbol according to:

$$\delta(b_2) = \mu(s(*,*,0,*)) - \mu(s(*,*,1,*)); \text{ and}$$

generate the soft value $\delta(b_3)$ for the bit $b_3$ in $b_0 \ldots b_3$ of the corresponding received symbol according to:

$$\delta(b_3) = \mu(s(*,*,*,0)) - \mu(s(*,*,*,1));$$

wherein:

$\mu(s(*,*,0,*))$ is defined as:

$$\mu(s(*,*,0,*)) \triangleq \min_{b_0,b_1,b_3 \in \{0,1\}} \mu(s(b_0, b_1, 0, b_3))$$
$$= \min(\mu(s(*,*,0,0)), \mu(s(*,*,0,1)))$$

$\mu(s(*,*,1,*))$ is defined as:

$$\mu(s(*,*,1,*)) \triangleq \min_{b_0,b_1,b_3 \in \{0,1\}} \mu(s(b_0, b_1, 1, b_3))$$
$$= \min(\mu(s(*,*,1,0)), \mu(s(*,*,1,1))),$$

and
$\mu(s(*,*,*,*))$ is defined as:

$$\mu(s(*,*,*,*)) \triangleq \min_{b_0,b_1,b_2,b_3 \in \{0,1\}} \mu(s(b_0, b_1, b_2, b_3))$$
$$= \min(\mu(s(*,*,0,*)), \mu(s(*,*,1,*))).$$

9. The wireless node of claim 5 wherein in order to provide the soft values, the soft-value processor is adapted to, for each sample of the received signal:

compute values of the modified maximum likelihood metric for a corresponding received symbol $s(b_0, b_1, b_2, \ldots, b_{k-1})$ minimized over all possible choices of bits $b_0$ and $b_1$, where each value of the modified maximum likelihood metric corresponds to a different combination of values for bits $b_2$ through $b_{k-1}$; and generate soft values for each bit $b_i$ in $b_0, b_1, b_2, \ldots, b_{k-1}$ of the corresponding received symbol $s(b_0, b_1, b_2, \ldots, b_{k-1})$ based on the values of the modified maximum likelihood metric.

10. The wireless node of claim 1 wherein each sample of the received signal corresponds to a received symbol, and the soft-value processor is adapted to provide, for each bit of each received symbol, a bit decision for the bit and a soft value that represents a confidence of the bit decision.

11. The wireless node of claim 1 wherein each sample of the received signal corresponds to a received symbol, and the soft-value processor is adapted to provide a soft value for each bit of each received symbol that represents both a bit decision for the bit and a confidence of the bit decision.

12. A method of operation of a wireless node comprising:
providing samples of a received signal;
estimating a channel between a transmitter of the received signal and the wireless node based on the samples of the received signal; and
processing the samples of the received signal according to a soft-value generation scheme that accounts for variation of effective channel estimation error with transmitted symbols to thereby provide corresponding soft values,
wherein the soft-value generation scheme is based on a modified maximum likelihood metric that accounts for the variation of the effective channel estimation error with transmitted symbols and wherein the modified maximum likelihood metric is defined as:

$$\mu(s) = \beta(s)^{-1}\|r - \check{h}s\|^2 + MN_0 \ln \beta(s)$$

where $\mu(s)$ is the modified maximum likelihood metric for a symbol $s$, $r$ is the received signal, $\hat{h}$ is a channel estimate, $M$ is a number of receive antennas of the wireless node, $N_0$ is noise power spectral density, and $\beta(s)$ is defined as:

$$\beta(s) = 1 + |s|^2/G,$$

where $G$ is a processing gain resulting from channel estimation.

13. The method of claim 12 wherein a modulation scheme of the received signal has a modulation alphabet A containing $2^k$ symbols, and providing the soft values comprises, for each sample of the received signal:
selecting a symbol hypothesis $\tilde{s}$ from the modulation alphabet A that minimizes the modified maximum likelihood metric $\mu(\tilde{s})$ for the sample of the received signal as a symbol decision $\hat{s}$ representing bits $\hat{b}_0 \ldots \hat{b}_{k-1}$; and
for each bit $\hat{b}_i$ in $\hat{b}_0 \ldots \hat{b}_{k-1}$, generating a soft value for bit $\hat{b}_i$ based on a difference between $\mu(\check{s})$ and $\mu(\hat{s})$, where $\check{s}$ is a symbol from a subset $\check{A}$ of the modulation alphabet A containing all symbol hypotheses $\tilde{s}$ having a bit value $\check{b}_i$ that is the opposite of the bit $\hat{b}_i$ that minimizes $\mu(\tilde{s})$ for the subset $\check{A}$.

14. The method of claim 13 wherein generating the soft value for the bit $\hat{b}_i$ comprises generating the soft value for the bit $\hat{b}_i$ according to:

$$\delta(\hat{b}_i) = \mu(\check{s}) - \mu(\hat{s}),$$

where $\delta(\hat{b}_i)$ is the soft value for the bit $\hat{b}_i$.

15. The method of claim 13 wherein generating the soft value for the bit $\hat{b}_i$ comprises generating the soft value for the bit $\hat{b}_i$ according to:

$$\delta(\hat{b}_i) = (-1)^{\hat{b}_i}(\mu(\check{s}) - \mu(\hat{s})),$$

where $\delta(\hat{b}_i)$ is the soft value for the bit $\hat{b}_i$ and the soft value $\delta(\hat{b}_i)$ represents both a bit decision for the bit $\hat{b}_i$ and a confidence of the bit decision for the bit $\hat{b}_i$.

16. The method of claim 12 wherein a modulation scheme of the received signal is a Gray-Mapped N Quadrature Amplitude Modulation, N-QAM, scheme having a modulation alphabet A containing $2^k = N$ symbols.

17. The method of claim 16 wherein processing the samples of the received signal to provide the soft values comprises, for each sample of the received signal, generating a soft value for each bit $b_i$ in $b_0 \ldots b_{k-1}$ of a corresponding received symbol utilizing less than N values of the modified maximum likelihood metric.

18. The method of claim 16 wherein processing the samples of the received signal to provide the soft values comprises, for each sample of the received signal:
computing values of the modified maximum likelihood metric defined as:

$$\mu(s(*,*,0,0)) = \frac{\|r\|^2 + \frac{1}{5}\|\hat{h}\|^2 - [|\text{Re}\{x\}| + |\text{Im}\{x\}|]}{1 + \frac{1}{5G}} + MN_0 \ln\left(1 + \frac{1}{5G}\right)$$

$$\mu(s(*,*,0,1)) = \frac{\|r\|^2 + \|\hat{h}\|^2 - [|\text{Re}\{x\}| + 3|\text{Im}\{x\}|]}{1 + \frac{1}{G}} + MN_0 \ln\left(1 + \frac{1}{G}\right)$$

$$\mu(s(*,*,1,0)) = \frac{\|r\|^2 + \|\hat{h}\|^2 - [3|\text{Re}\{x\}| + |\text{Im}\{x\}|]}{1 + \frac{1}{G}} + MN_0 \ln\left(1 + \frac{1}{G}\right)$$

$$\mu(s(*,*,1,1)) = \frac{\|r\|^2 + \frac{9}{5}\|\hat{h}\|^2 - [3|\text{Re}\{x\}| + 3|\text{Im}\{x\}|]}{1 + \frac{9}{5G}} + MN_0 \ln\left(1 + \frac{9}{5G}\right)$$

wherein a received symbol $s(b_0, b_1, b_2, b_3)$ is a function of bits $b_0 \ldots b_3$, $\mu(s(*,*, b_2, b_3))$ is the modified maximum likelihood metric for the received symbol $s(b_0, b_1, b_2, b_3)$ minimized over all possible choices of the bits $b_0$ and $b_1$ for given values for the bits $b_2$ and $b_3$, and $x$ is defined as:

$$x \triangleq \sqrt{2/5}\hat{h}^H r; \text{ and}$$

generating soft values for each bit $b_i$ in $b_0 \ldots b_3$ of a corresponding received symbol based on values $\mu(s(*,*,0,0))$, $\mu(s(*,*,0,1))$, $\mu(s(*,*,1,0))$, and $\mu(s(*,*1,1))$.

19. The method of claim 18 wherein generating the soft values for each bit $b_i$ in $b_0 \ldots b_3$ of the corresponding received symbol comprises:
generating the soft value $\delta(b_0)$ for the bit $b_0$ in $b_0 \ldots b_3$ of the corresponding received symbol according to:

$$\delta(b_0) = \text{sgn}(\text{Re}\{\hat{h}^H r\}) \left[ \mu(s(*,*,*,*)) - \min \begin{pmatrix} \mu(s(*,*,0,0)) + \frac{2|\text{Re}\{x\}|}{1+\frac{1}{5G}} \\ \mu(s(*,*,0,1)) + \frac{2|\text{Re}\{x\}|}{1+\frac{1}{G}} \\ \mu(s(*,*,1,0)) + \frac{6|\text{Re}\{x\}|}{1+\frac{1}{G}} \\ \mu(s(*,*,1,1)) + \frac{6|\text{Re}\{x\}|}{1+\frac{9}{5G}} \end{pmatrix} \right];$$

generating the soft value $\delta(b_1)$ for the bit $b_1$ in $b_0 \ldots b_3$ of the corresponding received symbol according to:

$$\delta(b_1) = \text{sgn}\left(\text{Im}\left\{\hat{h}^H r\right\}\right) \left[\mu(s(*,*,*,*)) - \min\begin{pmatrix} \mu(s(*,*,0,0)) + \dfrac{2|\text{Im}\{x\}|}{1+\frac{1}{5G}} \\ \mu(s(*,*,0,1)) + \dfrac{6|\text{Im}\{x\}|}{1+\frac{1}{G}} \\ \mu(s(*,*,1,0)) + \dfrac{2|\text{Im}\{x\}|}{1+\frac{1}{G}} \\ \mu(s(*,*,1,1)) + \dfrac{6|\text{Im}\{x\}|}{1+\frac{9}{5G}} \end{pmatrix}\right];$$

generating the soft value $\delta(b_2)$ for the bit $b_2$ in $b_0 \ldots b_3$ of the corresponding received symbol according to:

$\delta(b_2) = \mu(s(*,*,0,*)) - \mu(s(*,*,1,*))$; and generating the soft value $\delta(b_3)$ for the bit $b_3$ in $b_0 \ldots b_3$ of the corresponding received symbol according to:

$\delta(b_3) = \mu(s(*,*,*,0)) - \mu(s(*,*,*,1))$;

wherein:

$\mu(s(*,*0,*))$ is defined as:

$$\mu(s(*,*,0,*)) \triangleq \min_{b_0,b_1,b_3 \in \{0,1\}} \mu(s(b_0, b_1, 0, b_3))$$
$$= \min(\mu(s(*,*,0,0)),\ \mu(s(*,*,0,1)))$$

$\mu(s(*,*,1,*))$ is defined as:

$$\mu(s(*,*,1,*)) \triangleq \min_{b_0,b_1,b_3 \in \{0,1\}} \mu(s(b_0, b_1, 1, b_3))$$
$$= \min(\mu(s(*,*,1,0)),\ \mu(s(*,*,1,1))),$$

and $\mu s(*,*,*,*))$ is defined as:

$$\mu(s(*,*,*,*)) \triangleq \min_{b_0,b_1,b_2,b_3 \in \{0,1\}} \mu(s(b_0, b_1, b_2, b_3))$$
$$= \min(\mu(s(*,*,0,*)),\ \mu(s(*,*,1,*))).$$

20. The method of claim 16 wherein processing the samples of the received signal to provide the soft values comprises, for each sample of the received signal:
computing values of the modified maximum likelihood metric for a corresponding received symbol $s(b_0, b_1, b_2, \ldots, b_{k-1})$ minimized over all possible choices of bits $b_0$ and $b_1$, where each value of the modified maximum likelihood metric corresponds to a different combination of values for bits $b_2$ through $b_{k-1}$; and
generating soft values for each bit $b_i$ in $b_0, b_1, b_2, \ldots, b_{k-1}$ of the corresponding received symbol $s(b_0, b_1, b_2, \ldots, b_{k-1})$ based on the values of the modified maximum likelihood metric.

\* \* \* \* \*